INVENTOR.
BERNARD J. WALLIS
BY
ATTORNEYS

June 2, 1964  B. J. WALLIS  3,135,395
TRANSFER DEVICE
Filed March 21, 1960  9 Sheets-Sheet 3

INVENTOR.
BERNARD J. WALLIS
BY
Barnes, Kisselle, Raisch & Choate
ATTORNEYS

INVENTOR.
BERNARD J. WALLIS

June 2, 1964  B. J. WALLIS  3,135,395
TRANSFER DEVICE
Filed March 21, 1960  9 Sheets-Sheet 5

INVENTOR.
BERNARD J. WALLIS
BY
Barnes, Kisselle, Raisch & Choate
ATTORNEYS

June 2, 1964

B. J. WALLIS 3,135,395

TRANSFER DEVICE

Filed March 21, 1960

INVENTOR.
BERNARD J. WALLIS
BY
Barnes, Kisselle, Raisch & Choate
ATTORNEYS

June 2, 1964  B. J. WALLIS  3,135,395
TRANSFER DEVICE

Filed March 21, 1960  9 Sheets-Sheet 8

INVENTOR.
BERNARD J. WALLIS
BY
Barnes, Kisselle, Raisch & Choate
ATTORNEYS

June 2, 1964   B. J. WALLIS   3,135,395
TRANSFER DEVICE
Filed March 21, 1960   9 Sheets-Sheet 9

INVENTOR.
BERNARD J. WALLIS
BY
Barnes, Kisselle, Raisch & Choate
ATTORNEYS

United States Patent Office 3,135,395
Patented June 2, 1964

3,135,395
TRANSFER DEVICE
Bernard J. Wallis, % Livernois Engineering Co.,
25200 Trowbridge, Dearborn, Mich.
Filed Mar. 21, 1960, Ser. No. 16,552
4 Claims. (Cl. 214—1)

This invention relates to a transfer device and more particularly to a device for indexing a work piece progressively through a plurality of stations such as in the case of a progressive die in a punch press.

In my copending application Serial No. 700,198, filed December 2, 1957, now Patent No. 2,929,485, dated March 22, 1960, there is disclosed and claimed a transfer device comprising a base or support on which is slidably arranged a carriage, the carriage in turn slidably supporting work gripping fingers. The transfer device is operated by the ram of the press through an actuator mounted on the carriage for reciprocation along a path parallel to the path of travel of the carriage on the base. The actuator has a lost motion connection with the carriage and a positive drive connection with the work engaging fingers such that during the lost motion travel of the actuator, the work engaging fingers are projected to work engaging position or are retracted, depending upon the direction of travel of the actuator, and thereafter, the actuator engages the carriage to shift the carriage on the support through a stroke corresponding to the distance between successive stations. While the transfer device of my said copending application has in general proved to be very satisfactory, experience has shown that it is not entirely fool proof under all conditions of operation.

It is an object of the present invention to render fool proof the transfer device described under all conditions of operation.

More specifically, the present invention incorporates means on the transfer device, preferably in the form of a toggle linkage, for locking the work gripping fingers in the work engaging position so that the work will not be accidentally released until the carriage has shifted or indexed the gripped work piece to the next successive station.

The transfer device of the present invention also embodies an interlock mechanism between the actuator and the carriage for preventing unwanted relative movement between the actuator and the carriage and more specifically for preventing the carriage from bouncing forwardly relative to the actuator after the positive driving connection between the actuator and the carriage has once been established.

A further feature of the transfer device of the present invention resides in the provision of a safety overload means for disconnecting the drive between the ram of the press and the transfer device if the transfer device becomes jammed or overloaded for some reason and at the same time incorporates a means for positively retracting the work gripping fingers such that when the main drive from the press ram to the transfer device is disconnected, the work gripping fingers will be in an out-of-the-way position when the ram of the press descends.

Other features and advantages of the transfer device of the present invention will become apparent from the following description and drawings in which.

Figure 1:
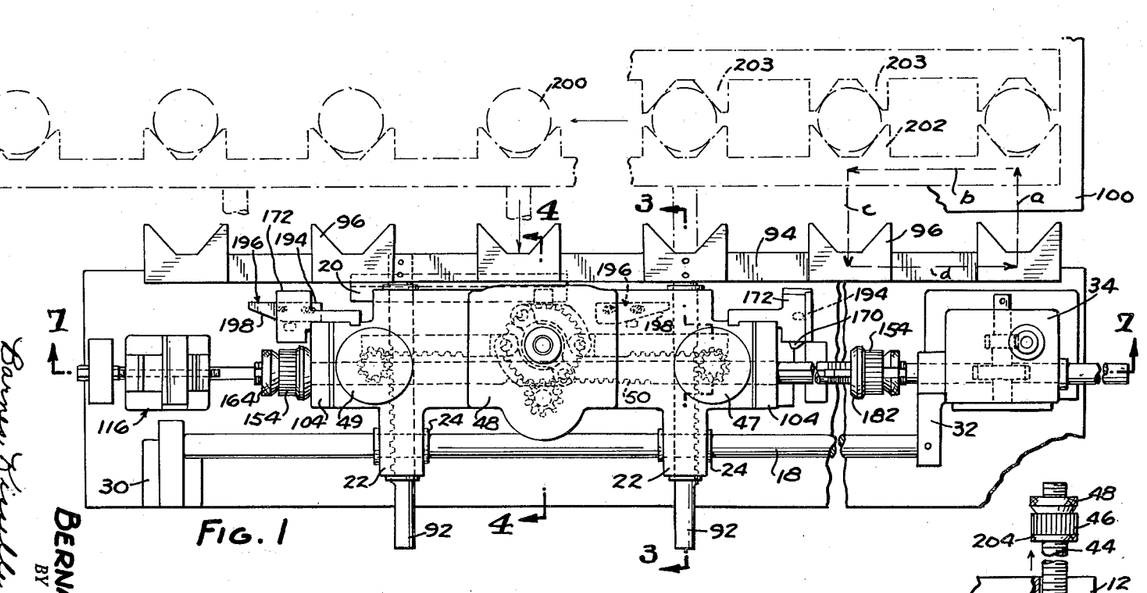
FIG. 1 is a plan view with parts broken away of a transfer device according to the present invention.

Referring to the drawings, particularly to FIGS. 1 through 12, the transfer device is shown mounted on a bed 10 of a press having a vertically reciprocating ram, a portion of which is shown at 12. The transfer device includes a base 14 mounted on the bed 10 of the press. A carriage 16 is mounted for reciprocation on base 14 by means of a guide rod 18 and a roller track 20. As is shown in FIG. 1, carriage 16 comprises a casting provided with a pair of bosses 22 at one side thereof in which are fitted bushings 24 which are slidably received on a fixed guide rod 18. Guide rod 18 is supported on base 14 at one end by means of a bracket 30 and at the other end by means of an arm extension 32 on a drive housing 34. Along the opposite side of carriage 16 and at the lower face thereof, there is journalled a roller 26 received within a rectilinear groove 28 in track 20.

Figure 2:
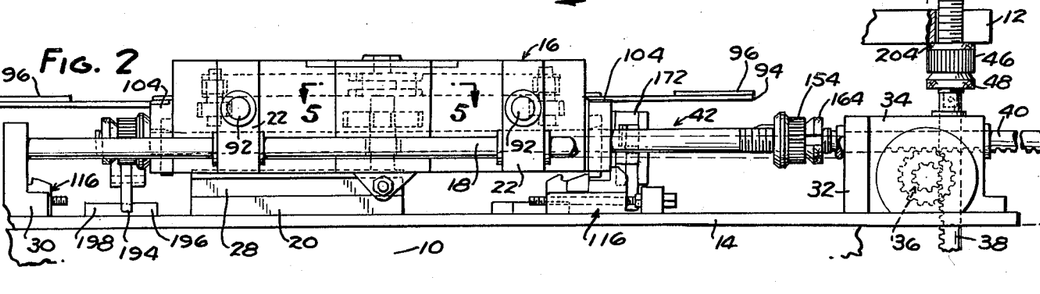
FIG. 2 is a fragmentary side elevational view with parts broken away of the transfer device and a fragmentary showing of the press on which it is mounted.

Within drive housing 34, there is journalled a gear set 36 comprising two pinions, the smaller of which meshes with a vertically extending gear rack 38 and the larger of which meshes with a gear rack portion 40 of an actuator bar 42. The upper end portion of vertical gear rack 38 is provided with a threaded section 44 on which are adjustably threaded a pair of adjusting nuts 46 which, when adjusted, are adapted to be locked in position by lock nuts 48. As is shown in FIG. 2, a portion 12 of the press ram is arranged between the adjusting nuts 46 so that when the ram descends, it engages the lower adjusting nut 46 and through the gear set 36 reciprocates actuator 42 towards the right as viewed in FIG. 2; and when the ram raises, it engages the upper adjusting nut 46 to reciprocate the actuator 42 in a direction towards the left as viewed in FIG. 2.

Figure 4:
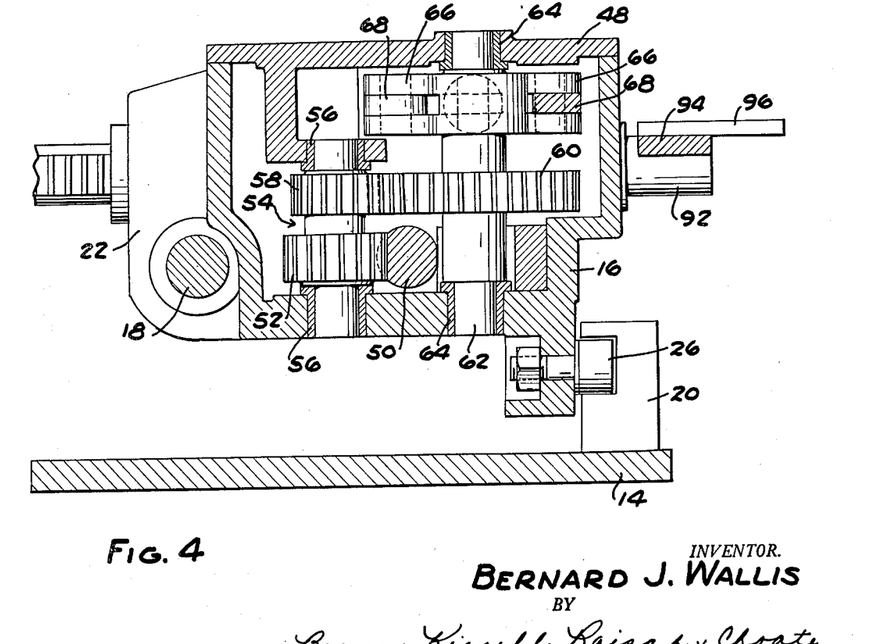
FIG. 4 is a sectional view taken along the line 4—4 in FIG. 1.
Figure 5:
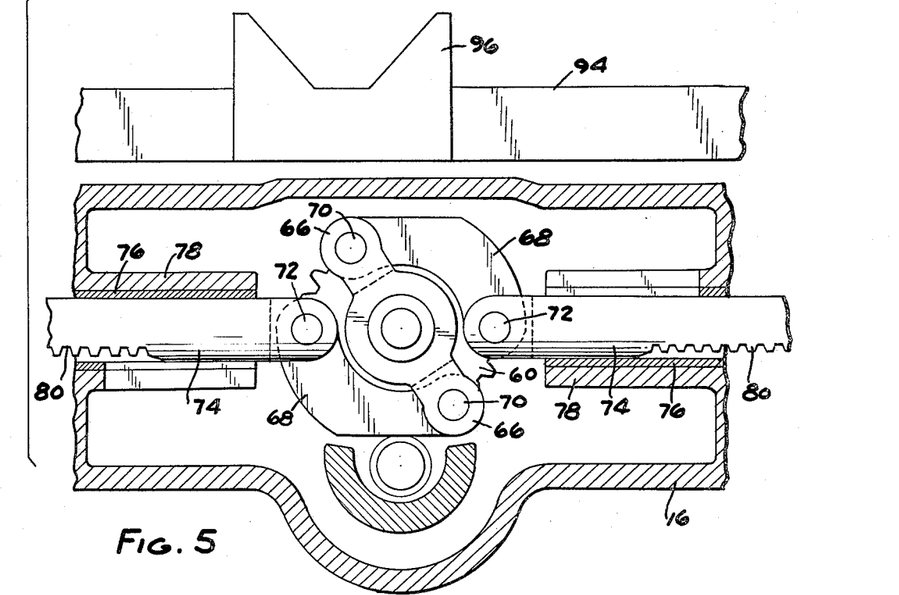
FIG. 5 is a sectional view taken along the line 5—5 in FIG. 2 showing the drive components for the work gripping fingers in their relative positions when the work gripping fingers are in the retracted position.

Carriage 16 is in the form of a hollow casting through which the actuator 42 extends. Cover plates 47, 48 and 49 are removably secured to the top face of the carriage casting by screws, not illustrated. A portion of actuator 42 within carriage housing 16 is formed as a gear rack 50 which meshes with the lower gear 52 of a gear set 54 journalled on a vertical axis in carriage housing 16 as by bearings 56 (FIG. 4). The upper gear 58 of gear set 54 meshes with a gear 60 fixed on a vertically extending stub shaft 62 which is journalled on a vertical axis within carriage housing 16 by means of bearings 64.

Figure 3:
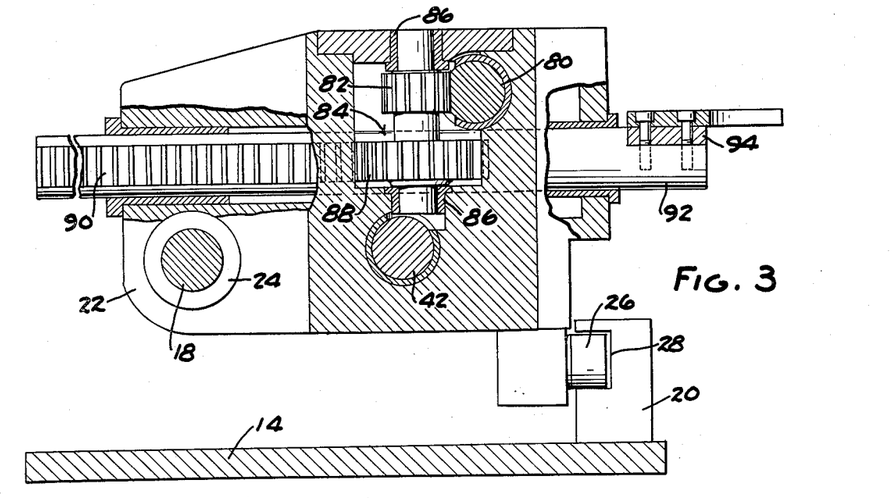
FIG. 3 is a sectional view taken along the line 3—3 in FIG. 1.

Referring now to FIGS. 3 through 6, it will be noted that adjacent the upper end of stub shaft 62, there is fixedly mounted on the stub shaft a pair of diametrically opposed crank arms 66. A pair of arcuate links 68 are pivoted at one end one to each of the outer ends of crank arms 66 as at 70. The other end of each link 68 is pivotally connected as at 72 to a straight link 74. Each of the links 74 are guided for rectilinear movement in a direction parallel to the line of travel of carriage 16 within bearings 76 mounted in sleeves 78 formed in the carriage housing 16. Each of the straight links 74 is provided with a gear rack portion 80 which meshes with the upper gear 82 of gear set 84 journalled on a vertical axis within carriage housing 16 by means of bearings 86. The lower gear 88 of each gear set 84 meshes with a rack portion 90 of a horizontally disposed shaft 92 (FIG. 3). As is shown in FIG. 1, there are two shafts 92 extending transversely of actuator 42; and at the inner side of the transfer device, the two shafts 92 mount a support bar 94 on which are secured work gripping fingers 96. Fingers 96 are located at regularly spaced intervals corresponding to the distance between successive stations on the die which is illustrated fragmentarily at 100.

Referring now to FIGS. 1, 2 and 7 through 10, there is mounted at each end of carriage 16 a vertically sliding lock plate 102. Sliding lock plates 102 are retained at each end of carriage 16 by means of retainers 104 mounted on the opposite end faces of carriage 16. Springs 106 bias lock plates 102 vertically downwardly to a position wherein lugs 108 on each lock plate 102 engage with shoulders 110 on retainers 104 to limit the extent of downward movement of lock plates 102. Each lock plate 102 is centrally apertured as at 112 to accommodate actuator 42. The upper straight edge of aperture 112 is provided with an outwardly and upwardly inclined cam face 114.

A pair of stop assemblies 116 are mounted on base 10 for retaining the carriage in fixed position at opposite ends of its stroke. Each stop assembly 116 comprises a base 118 mounted in a groove 120 for adjustment in a direction parallel to the axis of actuator 42. An adjusting screw 122 journalled on a stationary block 124 on base 10 threads into base 118 so that as the screw 122 is rotated in opposite directions, the base 118 is shifted longitudinally in groove 120. A lock nut 126 is provided for retaining the adjusted position of base 118. Screws 125 extending through elongated openings 127 in base 118 and threaded into base 14 are also provided for maintaining the adjusted position of each stop assembly 116.

Figure 8:
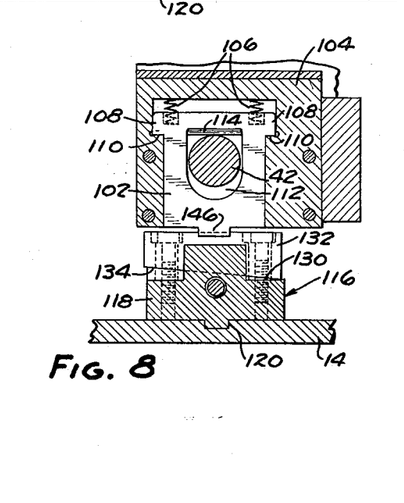
FIG. 8 is a sectional view taken along the line 8—8 in FIG. 7.
Figure 9:
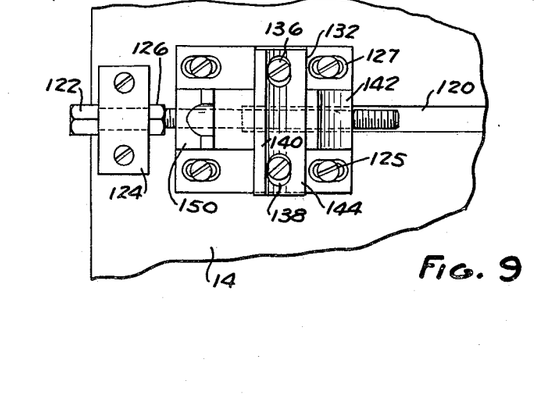
FIG. 9 is a fragmentary plan view of a portion of the transfer device as viewed in the direction of the arrow 9 in FIG. 7.

Base 118 is provided with an intermediate transversely extending groove 128, the bottom face of which, designated 130, is inclined in a direction transversely of base 118 as shown in FIG. 8. The inclined face 130 forms a bearing face for a wedge block 132, the lower face of which is similarly inclined as indicated at 134 in FIG. 8. Wedge block 132 is retained in a transversely adjusted position on bearing face 130 by means of a pair of screws 136 threaded into base 118 and extending through transversely elongated openings 138 in block 132. It will be appreciated that the transverse adjustment of wedge block 132 on the bearing face 130 determines the extent to which the upper straight edge 140 of wedge block 132 projects above base 14. The top side of base 118 is provided with a cam face 142 and the top side of wedge block 132 is likewise provided with a cam face 144. When carriage 16 is shifted to either end of its stroke, these cam faces are successively engaged by the lug 146 at the lower end of the sliding lock plates 102. When the lug 146 engages behind the shoulder 148 formed by wedge block 132, the outer face of retainer 104 abuts against a stop lug 150 on base 118 so that the carriage is effectively locked at each end of its stroke. Thereafter, the carriage can be shifted only by retracting the sliding stop plate 102 from behind the shoulder 148 of wedge block 132.

Figures 7, 10:
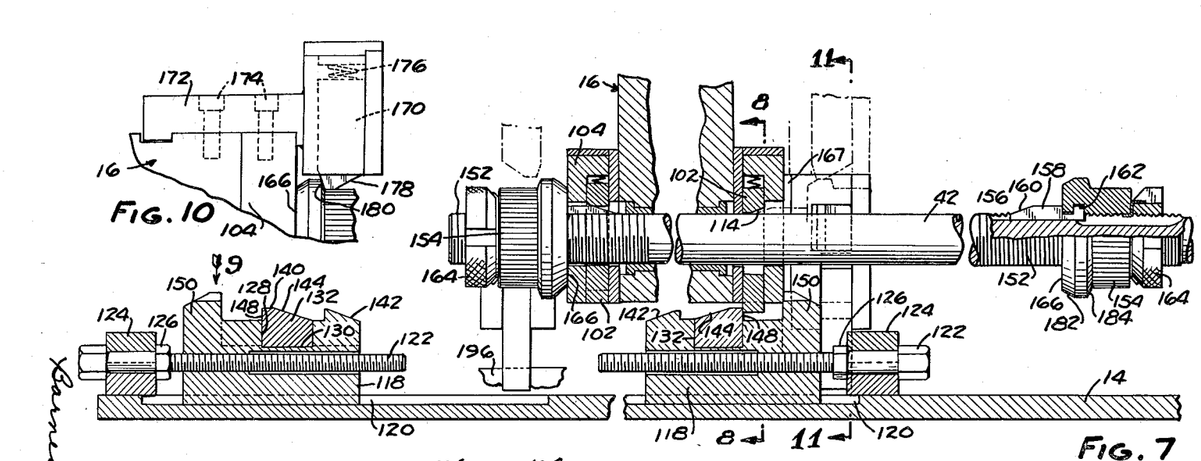
FIG. 7 is a fragmentary longitudinal vertical sectional view of the transfer device with parts broken away taken along the line 7—7 in FIG. 1.
FIG. 10 is a fragmentary side elevational view of a portion of the transfer device showing the actuator in driving relation with the carriage.

The means for retracting the lock plates 102 and for shifting the carriage between opposite ends of its stroke are illustrated in FIGS. 1, 2 and 7. Actuator 42 is provided with two threaded portions 152 on which are threaded adjusting nuts 154. Each threaded portion 152 is formed with a keyway 156 in which is slidably arranged a key 158 having a cam 160 at its forward end. The opposite end of each key 158 is engaged with its associated adjusting nut 154 as at 162 so that keys 158 are shifted axially in their respective grooves 156 in response to threaded adjustment of nuts 154. A lock nut 164 is provided on the threaded portions 152 for each of the adjusting nuts 154. Each adjusting nut 154 is fashioned with a flat forward face 166 which, when the actuator 42 is reciprocated, is adapted to abut against the outer flat faces 167 of guide plates 104 to provide a lost motion driving connection between the actuator 42 and carriage 16. In FIGS. 1, 2 and 7, the adjusting nut 154 at the left end of actuator 42 is shown in abutting relation with the guide plate 104 at the left end of carriage 16. Both actuator 42 and carriage 16 are illustrated at the extreme right ends of their respective strokes.

The cam 160 at the forward end of each key 158 is arranged to engage with the cam edge 114 of aperture 112 in lock plate 102 to shift the lock plate upwardly just prior to abutting engagement of the forward face 166 of adjusting nut 154 with guide plate 104. When lock plate 102 is released from engagement with wedge block 132, the carriage 16 is free to shift axially away from lug 150 on base 118.

In order to prevent the carriage from bouncing forwardly when the forward face 166 of one of the adjusting nuts 154 engages its associated guide plate 104, means are provided for interlocking actuator 42 with the carriage at the moment of impact between adjusting nut 154 and guide plate 104. These interlocking means comprise plungers 170 slidably mounted in brackets 172. Brackets 172 are mounted one at each end of carriage 16 as by screws 174. Brackets 172 are located on the inner side of carriage 16, that is, the side of the carriage adjacent the work engaging fingers 96. Plungers 170 are arranged for sliding movement in a horizontal plane toward and away from actuator 42. The plungers are biased toward the actuator by means of springs 176. Although plungers 170 are horizontally disposed, they are illustrated in FIG. 7 in broken lines as extending in a vertical plane merely for the purposes of illustration. The outer end of each plunger is provided with a forward cam face 178 and a rear cam face 180. Cam face 180 is steeply inclined relative to cam face 178.

Each adjusting nut 154 is likewise provided at the forward end thereof with a forward cam face 182 and a rearward cam face 184. The cam faces 182 on the adjusting nuts 154 preferably, but not necessarily, correspond in inclination with the cam faces 178 on plungers 170 and the cam faces 184 on the adjusting nuts correspond in inclination with the cam faces 180 on plungers 170. The cam faces on the plungers 170 and the adjusting nuts 154 are so related that when the cam face 180 on one of the plungers 170 is in coplanar engagement with the cam face 184 on the associated adjusting nut, the front flat face 166 of the adjusting nut is in coplanar engagement with the outer face 167 of the retainer 104 at the corresponding end of carriage 16. When either of the plungers 170 are so engaged with its associated adjusting nut 154 as shown in FIG. 10, the carriage 16 is effectively interlocked with actuator 42.

When the actuator 42 is shifted towards one end of carriage 16, for example, towards the left as shown in FIG. 7, the forward cam face 182 of the adjusting nut 154 at the right is adapted to engage the cam face 178 of the plunger 170 at the right end of the carriage to retract the plunger against the bias of spring 176 and thus permit the plunger to engage behind the cam face 184 on the adjusting nut to interlock the carriage 16 and the actuator 42.

Figure 11:
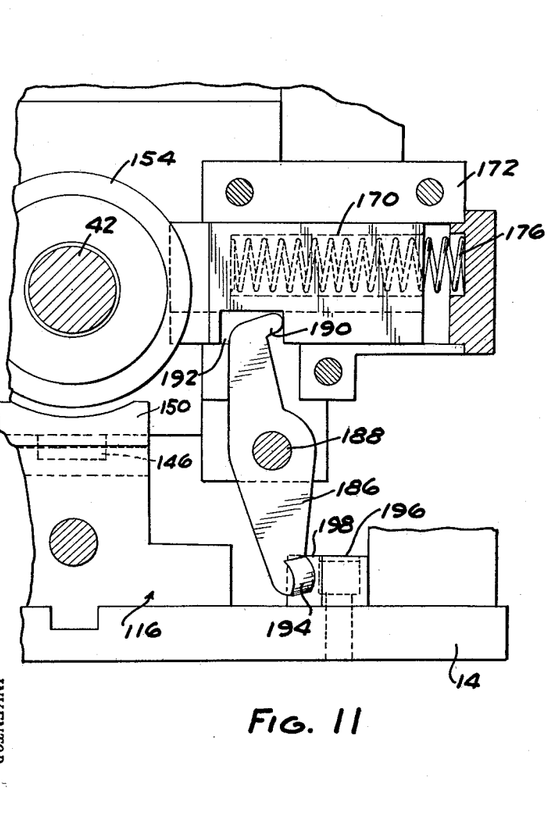
FIG. 11 is a sectional view taken along the line 11—11 in FIG. 7.
Figure 12:
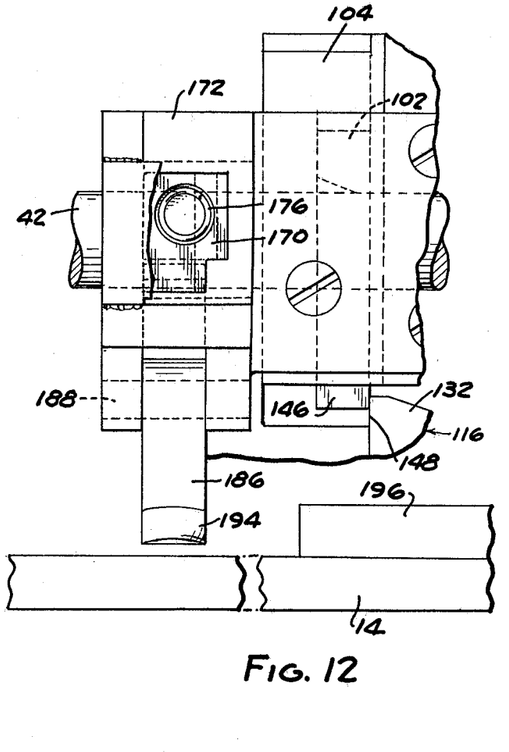
FIG. 12 is a fragmentary side elevational view with parts broken away of the portion of the transfer device shown in FIG. 11.
Figure 13:
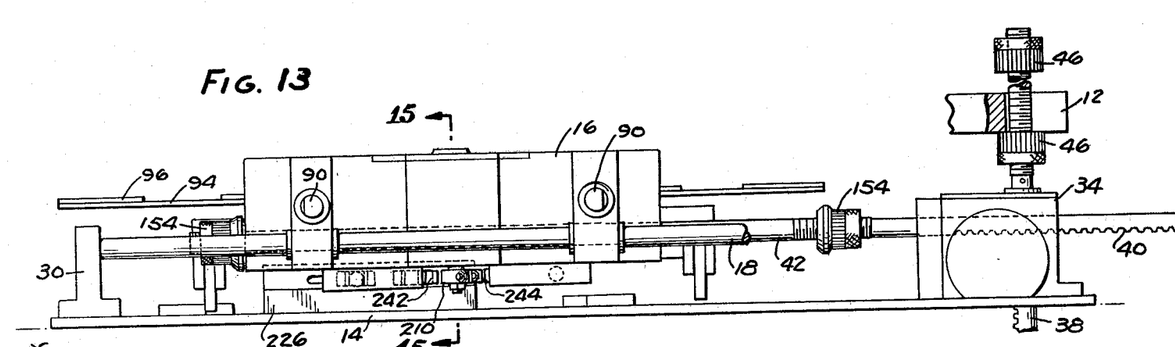
FIG. 13 is a side elevational view with parts broken away of a modified form of transfer device according to the present invention.

The inclination of cam faces 180 and 184 may be such that when the actuator is retracted, the plunger 170 is likewise retracted by the inter-action of these cam faces. However, it is preferred to have the plungers 170 positively retracted. The mechanism for positively retracting plungers 170 is illustrated in FIGS. 1, 11 and 12. This mechanism includes a pair of rocker arms 186, each pivoted as at 188 at opposite ends of the carriage for rocking movement in a vertical plane extending transversely of the path of travel of the carriage. The upper end 190 of each rocker arm is engaged within a notch 192 in one of the plungers 170. The lower end of each rocker arm 186 is rounded as indicated at 194. A pair of cams 196 are adjustably mounted on base 14 as shown in FIG. 1. Each cam is provided with a cam face 198 which is adapted to be engaged by the rounded end 194 of the associated rocker arm 186 when the carriage is shifted towards the end of its stroke in one direction so as to retract plunger 170 from behind the cam face 184 at the end of the stroke of the carriage. Then, when the carriage is shifted in the opposite direction, the plunger 170 is retained in a retracted position for a period sufficient to enable the associated adjusting nut 154 to back away from abutting relation with the associated retainer 104.

The operation of the transfer device shown in FIGS. 1 through 12 will now be described. With the press ram 12 in its lowermost position, actuator 42 and carriage 16 will both be positioned at the extreme right ends of their respective strokes as illustrated in FIGS. 1 and 2. The lower adjusting nut 46 on the threaded portion 44 of the vertical gear rack 38 is adjusted such as to contact the lower face of the ram 12. In this position of the carriage 16, the work gripping fingers 96 should be transversely aligned with each of the stations in die 100. This alignment is obtained by adjusting the screw 122 of stop assembly 116 at the right while the carriage is locked with this stop assembly by reason of the lock plate 102 engaging behind wedge block 132. This adjustment shifts the carriage 16 axially of actuator 42. After the carriage 16 is adjusted so that the work gripping fingers 96 are transversely aligned with the stations on the die 100, screws 125 are tightened. Carriage 16 is thus locked at the right end of its stroke. Adjusting nut 154 at the left is then adjusted on actuator 42 such that its forward face 166 engages the outer face 167 of retainer 104 at the left.

Figure 6:
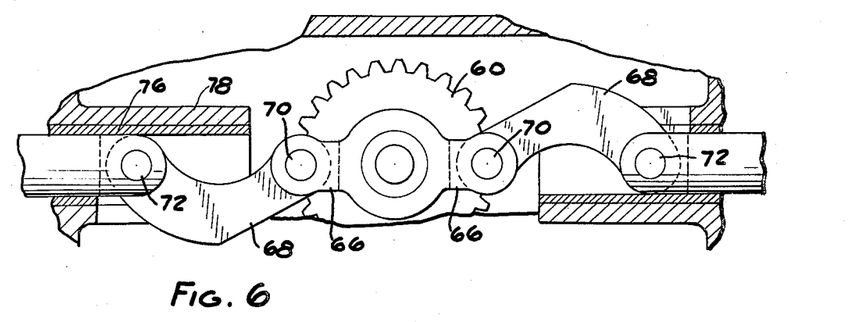
FIG. 6 is a fragmentary sectional view similar to FIG. 5 and showing the same drive components in their relative positions when the work gripping fingers are in their work engaging position.

When the press ram 12 rises, it abuts against the lower face of upper adjusting nut 46 on the vertically extending gear rack 38 to shift the gear rack upwardly. This causes the actuator 42 to be shifted to the left by reason of the gear set 36. As soon as the actuator 42 starts moving to the left, the gear rack portion 50 on actuator 42 drives the gear set 54 and through the gear 60, rotates the crank arms 66 in a clockwise direction from the position shown in FIG. 5. As the crank arms 66 rotate in a clockwise direction, the gear rack links 74 are shifted axially in opposite directions by the arcuate links 68 until the position of FIG. 6 is reached wherein the pivots 72 and 66 are axially aligned with the pivot axis of cranks 66. It will be appreciated that the arcuate links 68 and the gear rack links 74 form a toggle which is straightened when the components are in the positions illustrated in FIG. 6.

As the gear rack links 74 move axially away from cranks 66, the rack portions 80 thereof drive gear sets 84 in a direction to project the shafts 92 and thus the work gripping fingers 96 toward the work pieces 200 that are in the die. When the toggles referred to are in the straightened condition shown in FIG. 6, the work gripping fingers 96 are in the work engaging position indicated by broken lines at 202 in FIG. 1.

At this point, it should be pointed out that preferably, there are two oppositely arranged transfer devices mounted on the press, one on one side of the die as illustrated in FIG. 1 and another (not shown) on the opposite side of the die. Each of the two work transfer devices is provided with work gripping fingers 96 and the two are operated in unison so that the work pieces are gripped from diametrically opposite sides. The work gripping fingers 96 on one transfer device are transversely aligned with the work gripping fingers of the other transfer device. The work gripping fingers of the transfer device not shown are designated 203 in FIG. 1.

The adjusting nut 154 at the right end of carriage 16 is then adjusted on the actuator such that when the two toggles 68, 74 assume the straightened position illustrated in FIG. 6, the flat forward face 166 of the right adjusting nut 154 abuts against the outer face 167 of the retainer 104 at the right end of carriage 16. Thus, as actuator 42 shifts to the left from the position shown in FIGS. 1 and 7, the work gripping fingers 96 are projected toward the work pieces 102 along the path designated a in FIG. 1; and just before the work gripping fingers 96 engage the work pieces, the key 158 associated with the adjusting nut 154 at the right of the carriage engages the lock plate 102 within the retainer 104 at the right end of the carriage and starts to retract the lower end 146 thereof from behind the shoulder 148 of wedge block 132. However, before the lock plate 102 is fully retracted from behind shoulder 148, the forward cam face 182 on adjusting nut 154 engages the cam face 178 of the plunger 170 at the right end of carriage 16 to shift the plunger outwardly as is shown in broken lines in FIG. 7. The adjustment is such that plunger 170 begins to move inwardly behind the cam face 184 on nut 154 under the influence of spring 176 before lock plate 102 is fully retracted from behind shoulder 148 on wedge block 132.

As is apparent, the stroke of the carriage is determined by the setting of adjusting nuts 154 in relation to the setting of adjusting nuts 46 on the vertical gear rack 38. Shifting of wedge blocks 132 of stop assemblies 116 in a transverse direction enables adjustment of the two transfer devices on opposite sides of the die such that both of the carriages will be released from their locked positions at exactly the same instant. In other words, it is important that each of the adjusting nuts 154 on the two transfer devices engage their respective retainers 104 at the same instant; and at this moment, the lugs 146 at the lower ends of the lock plates 102 must just clear the upper edges of shoulders 148 on wedge blocks 132.

At this point in the travel of actuator 42 in a direction towards the left, it will be observed that the rocker arm 186 at the left end of the carriage is in engagement with the cam 198 to hold the plunger 170 at the left end of the carriage in a retracted position relative to the adjusting nut 154 at the left end of actuator 42. Thus, the carriage 16 is thereby free to shift toward the left on guide bar 18 and roller track 20. With continued movement of actuator 42 to the left, the gripped work pieces 200 are fed to the left by the two sets of work gripping fingers 96 until the carriages reach a position wherein the lug 146 at the lower end of the lock plate 102 at the left end of each carriage engages behind the shoulder 148 of wedge block 132 on the stop assemblies 116 at the left end of base 14. This feed stroke of the carriage is designated b in FIG. 1.

The distance through which carriage 16 of the transfer device is shifted to the left must correspond exactly with the distance between successive stations on the die. This is assured by proper adjustment of nuts 46 on vertical gear rack 38 and the proper location of stop assemblies 116. The proper relationship is established by first locating the stop assembly 116 at the left so that the carriage is locked in a position wherein the work engaging fingers 96 are transversely aligned with the next successive stations on the die. Thereafter, the upper adjusting nut 46 is threaded down on the threaded portion 44 of vertical gear rack 38 so that it just contacts the upper face of the press ram 12. In order to allow for small variations, compressible rubber pads 204 are preferably interposed between the bottom face of the upper nut 46 and the upper face of press ram 12 and between the upper face of the lower adjusting nut 46 and the lower face of press ram 12.

When the carriage 16 reaches the end of its stroke in a direction towards the left, the rocker arm 186 at the right end of carriage 16 engages the right cam 196 on the base 14 to retract plunger 170 at the right end of the machine from behind the adjusting nut 154 at the right end of actuator 42. Then, as the press ram 12 descends, actuator 42 moves toward the right; and by reason of the drive previously described, the toggle links 68 and 74 are shifted from the position shown in FIG. 6 to the position shown in FIG. 5. This causes the work gripping fingers 96 to be retracted along the line c in FIG. 1 from the work engaging position illustrated by broken lines at 202 to the solid line position shown in FIG. 1. When the toggle links 74, 68 reach the position shown in FIG. 5, the adjusting nut 154 at the left end of actuator 42 abuts against the retainer 104 at the left end of carriage 16 and the lock plate 102 at the left end of the carriage is retracted from behind the wedge block 132 on stop assembly 116 at the left end of base 14. Further movement of actuator 42 in a direction toward the right causes the carriage 16 to be retracted toward the right along the path designated d to the starting position shown in FIGS. 1 and 2.

In the operation just described, several important features of the transfer device of this invention should be appreciated. It will be noted, for example, that the plungers 170 provide a very important function. These plungers interlock the actuator 42 with the carriage 16 so that when the flat leading end 166 of either adjusting nut 154 engages the outer face 167 of its associated retainer 104, the carriage 16 will not have a tendency to bounce away and forwardly with respect to the actuator 42. Furthermore, a portion of the energy of the moving actuator just prior to the impact of nut 154 against its associated retainer 104 is utilized for compressing spring 176. This kinetic energy is thus partially dissipated through spring 176 rather than being dissipated entirely as impact energy between the adjusting nut 154 and carriage 16. It will also be appreciated that a portion of the kinetic energy of the moving carriage 16 is absorbed at opposite ends of the stroke of the carriage by the compression of springs 176 through the action of rocker arms 186.

The arrangement of links 68, 74 is another important feature of the present invention. By utilizing the crank 66, it will be observed that the work engaging fingers 96 are decelerated as they approach the work engaging position illustrated at 202 in FIG. 1. Furthermore, when the work gripping fingers 96 are shifted to the work engaging position, the toggle linkage 68, 74 is straightened as shown in FIG. 6 to thus effectively lock the work gripping fingers in the work engaging position.

FIGS. 13 through 16 illustrate a modified arrangement for locking the carriage 16 at the opposite ends of its stroke. In this arrangement, the stub shaft 62 on which the gear 60 and the crank arms 66 are mounted is extended below carriage 16 and is provided at the lower end thereof with a fixed bushing 210 formed with a pair of angularly spaced and radially projecting lugs 212, 214. On each lug, there is threaded an adjusting screw 216 and a lock nut 218 is provided for locking the screw 216 in its adjusted position. On the underside of the carriage and on opposite sides of the stub shaft 62, there are mounted two brackets 220. In each bracket 220, there is slidably arranged a plunger 222. Plungers 222 are disposed with their axes extending horizontally and transversely of the path of travel of the carriage. These plungers are normally biased by springs 224 in a direction toward a roller track 226 by means of which the carriage 16 is partially supported as by the roller 228 journalled on the carriage. Each plunger 222 is provided at its outer end with a cam face 230 and a locking face 232.

Figure 14:
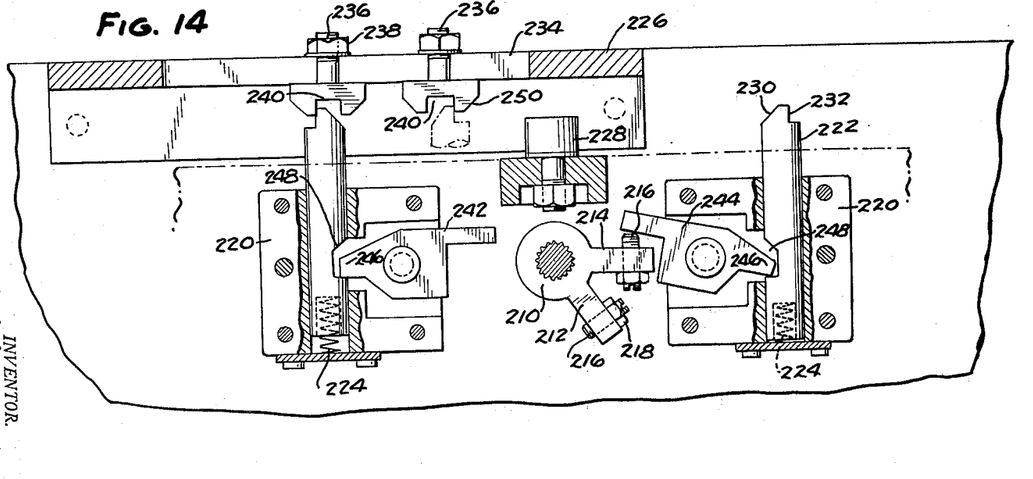
FIG. 14 is a sectional view taken along the line 14—14 in FIG. 15.
Figure 15:
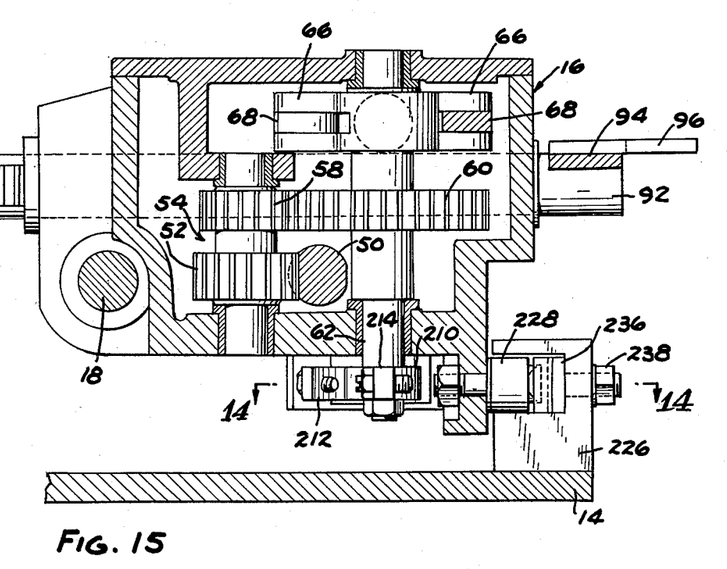
FIG. 15 is a sectional view taken along the line 15—15 in FIG. 13.
Figure 16:
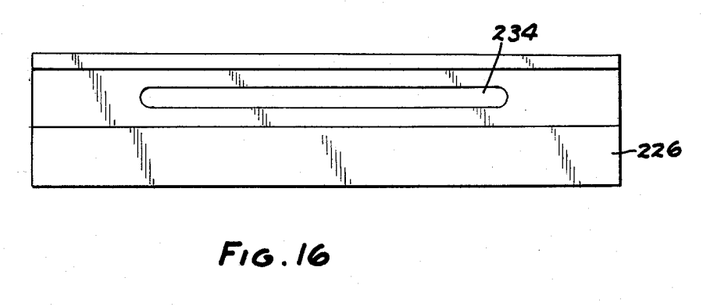
FIG. 16 is a side elevational view of the track shown in FIG. 14.

Roller track 226 is provided with a horizontally extending slot 234 in which a pair of stop lugs 236 are mounted for adjustment in a direction longitudinally of the transfer device. Lugs 236 are adapted to be locked in their adjusted position by tightening nuts 238. The adjustment of the stop lugs 236 in relation to the plungers 222 such that when the carriage reaches one end of its stroke, the right end, for example, as shown in FIG. 14, one of the plungers 222 engages within a notch 240 in one of the lugs 236; and when the carriage reaches the opposite end of its stroke, the other plunger 222 engages within the notch 240 of the other stop lug 236. In the arrangement shown in FIGS. 13 and 14, the carriage is locked at the right end of its stroke and the actuator is also at the extreme right end of its stroke.

As the actuator shifts to the right, stub shaft 62 rotates in a clockwise direction as viewed in FIG. 14. The adjusting screw 216 on lug 214 thus rotates away from the rocking lever 244 and the adjusting screw 216 on lug 212 rotates in a direction toward the rocking lever 242. Each of these rocking levers has a nose portion 246 engaged within a notch 248 in its associated plunger 222. Screws 216 are adjusted on their respective lugs such that when rotation of stub shaft 62 shifts the work gripping fingers 96 to the work engaging position shown at 202 in FIG. 1, the adjusting screw 216 on lug 212 engages rocking lever 242 to retract the locked plunger 222 from within the notch 240 of its respective locking lug 236. Thus, when the plunger 222 at the left of FIG. 14 is released from locking engagement with its respective lug 236, the carriage 16 is shifted to the left; and as it approaches the opposite end of its stroke, the cam face 230 of the locking plunger 222 on the right rides over the cam surface 250 of the locking lug 236 on the right so that at the end of the stroke, the locking plunger 222 on the right engages within the notch 240 of the righthand locking lug 236. When the actuator is retracted, stub shaft 62 rotates counterclockwise to cause interengagement of screw 216 on lug 214 with rocking lever 244 and to thereby retract plunger 222 on the right from its associated locking lug 236.

Figure 17:
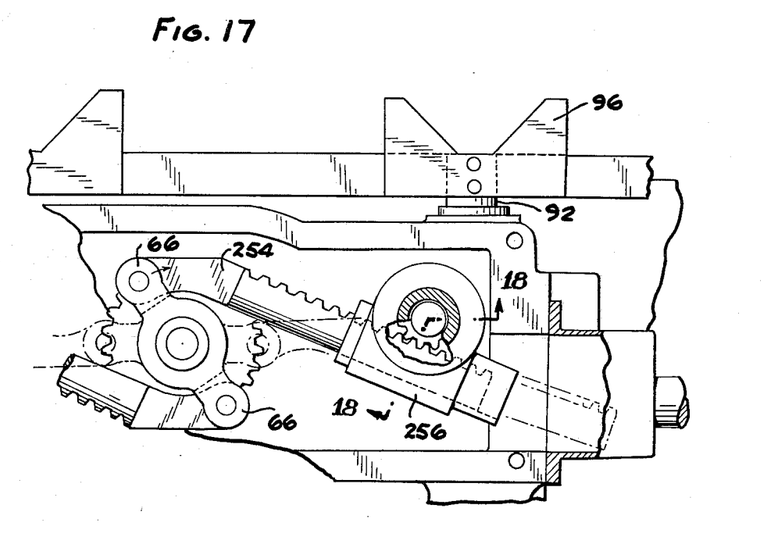
FIG. 17 is a fragmentary horizontal sectional view showing a further modified form of drive for the work gripping fingers.
Figure 18:
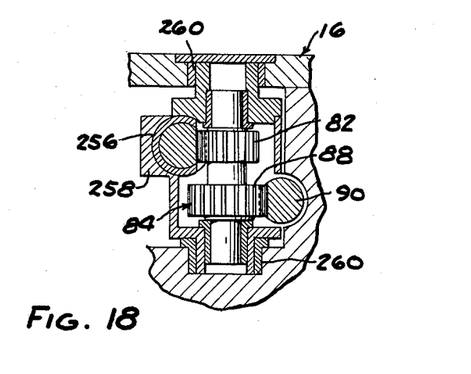
FIG. 18 is a sectional view taken along the line 18—18 in FIG. 17.

FIGS. 17 and 18 show a modified arrangement of toggle linkage for operating the work engaging fingers 96. In this arrangement, the crank arms 66 are pivoted directly as at 252 to gear rack links 254. Each gear rack link 254 is slidably arranged within a sleeve 256. Sleeve 256 is mounted in a bearing 258 which is journalled on carriage 16 as at 260. The gear set 84 which provides the drive to the work engaging fingers supporting shafts 92 is journalled within bearing 260. The upper gear 82 of this gear set meshes with the gear rack portion of link 254 and the lower gear 88 meshes with the gear rack portion 90 of shaft 92. This arrangement differs from the drive for the work gripping fingers illustrated in FIGS. 5 and 6 primarily in that the arcuate links 68 have been eliminated and the guide sleeves for the gear rack links are pivoted about the axis of gear set 84 rather than being fixed on the carriage as are the sleeves 78. The locked position of the toggle is illustrated in broken lines.

Figure 19:
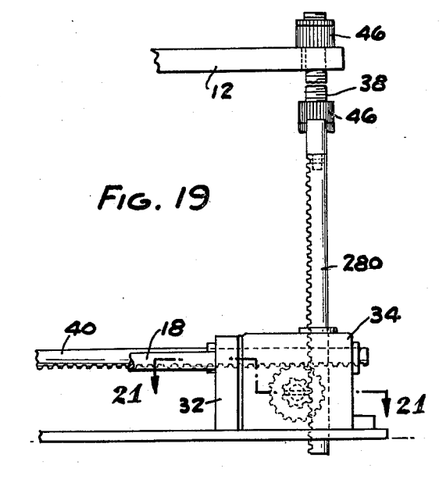
FIG. 19 is a fragmentary side elevational view illustrating a preferred form of drive arrangement between the press ram and the transfer device.
Figure 20:
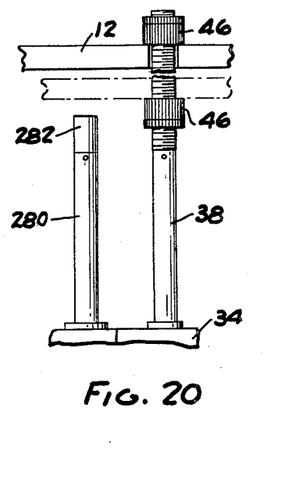
FIG. 20 is a fragmentary end elevational view of the arrangement shown in FIG. 19.
Figure 21:
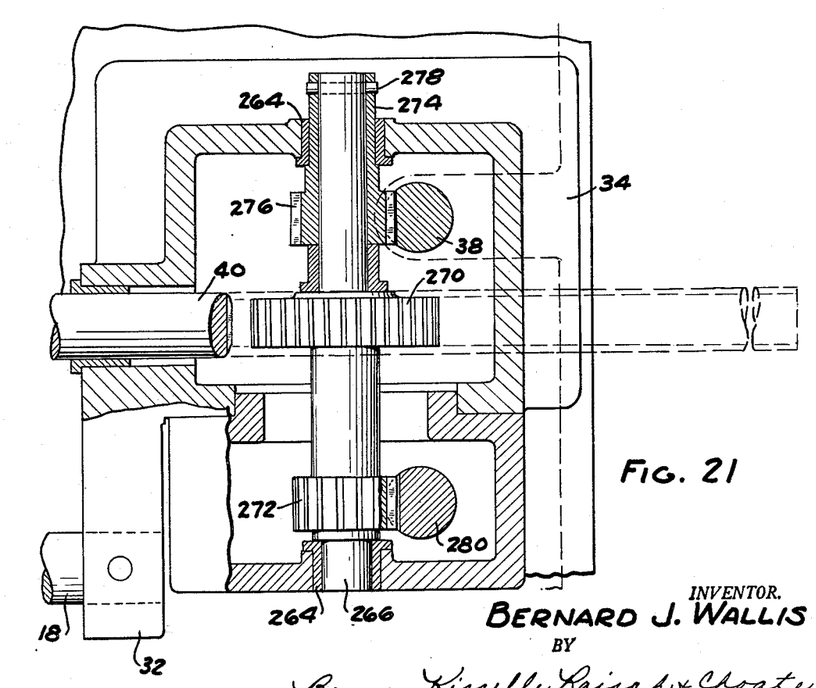
FIG. 21 is a sectional view along the line 21—21 in FIG. 19.

In FIGS. 19 through 21, there is illustrated a mechanism for insuring that the transfer device will "fail safe." In this arrangement, there is journalled within the drive housing 34 as by bearings 264 a shaft 266 on which is keyed a pinion 270 and a second pinion 272. Pinion 270 meshes with the gear rack portion 40 of actuator 42. On one end of shaft 266, there is arranged a sleeve 274 formed integrally with a pinion 276. Gear 276 meshes with the vertical gear rack 38 which is provided with the adjusting nuts 46. Sleeve 224 is connected with shaft 266 by means of a shear pin 278. A second vertically extending gear rack 280 meshes with pinion 272. Gear rack 280 is somewhat shorter than gear rack 38 and has its upper end 282 terminating at a level below the upper face of the lower adjusting nut 46 on gear rack 38. The safety feature of this arrangement will be readily appreciated. As long as there is no jam or excessive loading on the transfer device, shear pin 278 will remain intact, providing a driving connection between gear rack 32 and shaft 266. However, in case of a jam such as would happen, for example, when a work piece is accidentally displaced and improperly engaged by the work gripping fingers 96 when these fingers are projected to the work engaging position, shear pin 278 will break; and although the press ram 12 will continue to rise, no further drive will be imparted to the transfer device. However, on the downstroke of the press ram 12, the ram engages the upper end 282 of gear rack 280 and thus establishes a positive one-way drive to the work gripping fingers whereby to retract them to an out-of-the-way position. Thus, when the press ram reaches the lower end of its stroke, the die on the ram will not come down upon the work gripping fingers 96. In the arrangement illustrated in FIGS. 19 through 21, there is always the assurance that should there be a jam of some sort in the transfer device, at least the die and the work engaging fingers will not be damaged as would be the case if no provision were made for positively retracting the work engaging fingers from the path of movement of the closing die.

This application is a continuation-in-part of my co-pending application Serial No. 700,198, filed December 2, 1957, now Patent No. 2,929,485, dated March 22, 1960.

I claim:

1. In a work transfer device, a work engaging member movable to work engaging and retracted positions, means for actuating said member to said positions comprising a pair of reciprocating drive members adapted when moved in one direction to shift the work engaging member to work engaging position and when moved in the opposite direction to shift the work engaging member to retracted position, a driving connection between each of said driving members and said work engaging member, one of said driving connections being effective only in response to a load thereon below a predetermined value, a reciprocating power member having a bi-directional driving connection with the driving member having said one driving connection with the work engaging member and having a unidirectional driving connection with the other driving member.

2. A work transfer device as called for in claim 1 wherein said one driving connection with the work engaging member includes a shear pin.

3. A work transfer device as called for in claim 1 wherein said driving members comprise a pair of gear racks, said driving connections between the driving members and the work engaging member includes a pair of pinions operatively associated with the work engaging member and including a shear pin between the pinion of said one driving connection and the work engaging member.

4. In an apparatus for indexing a work piece progressively through several stations of a press having a reciprocating ram, the combination of a work engaging member movable to work engaging and retracted positions, means for actuating said member to said positions comprising a pair of reciprocating drive members adapted when moved in one direction to shift the work engaging member to work engaging position and when moved in the opposite direction to shift the work engaging member to retracted position, a driving connection between each of said driving members and said work engaging member, one of said driving connections being effective only in response to a load thereon below a predetermined value and means associated with the ram of the press having a bi-directional driving connection with the driving member having said one driving connection with the work engaging member and having a unidirectional driving connection with the other driving member.

References Cited in the file of this patent
UNITED STATES PATENTS

| | | |
|---|---|---|
| 806,140 | Helm | Dec. 5, 1905 |
| 2,475,874 | Bartlett | July 12, 1949 |
| 2,929,485 | Wallis | Mar. 22, 1960 |
| 2,933,943 | Buddo | Apr. 26, 1960 |
| 3,024,740 | Peras | Mar. 13, 1962 |